United States Patent [19]

Honjo

[11] Patent Number: 4,963,991
[45] Date of Patent: Oct. 16, 1990

[54] VIDEO TAPE RECORDER CAPABLE OF RECORDING BOTH NARROWBAND AND WIDEBAND SIGNALS

[75] Inventor: Masahiro Honjo, Neyagawa, Japan

[73] Assignee: Matsushita Electric Industrial Co., Ltd., Osaka, Japan

[21] Appl. No.: 303,743

[22] Filed: Jan. 25, 1989

[30] Foreign Application Priority Data

Jan. 25, 1988 [JP] Japan .................................. 63-13870

[51] Int. Cl.⁵ ........................................... H04N 5/782
[52] U.S. Cl. .................................... 358/310; 358/335; 360/9.1; 360/22
[58] Field of Search ............... 358/310, 320, 330, 335; 360/9.1, 32, 22, 19.1, 27, 29, 30

[56] References Cited

U.S. PATENT DOCUMENTS

| | | | |
|---|---|---|---|
| 4,730,222 | 3/1988 | Schauffele | 358/310 |
| 4,743,977 | 5/1988 | Yoshioka et al. | 360/19.1 |
| 4,743,978 | 5/1988 | Tanaka | 358/310 |
| 4,839,744 | 6/1989 | Sasaki et al. | 358/320 |
| 4,851,928 | 7/1989 | Numakura et al. | 358/330 |

*Primary Examiner*—Robert L. Richardson
*Attorney, Agent, or Firm*—Wenderoth, Lind & Ponack

[57] ABSTRACT

Disclosed is a video tape recorder capable of recording and reproducing signals with largely different frequency bands such as narrow band signals including NTSC signal and wide band signals represented by high definition television signal. In a time axis expansion circuit, wide band signals are expanded of their time axis and divided into plural channels, and the band frequencies of these channels are lowered, and at the same time, the widths of plural heads are set narrower than the head width used when recording and reproducing the existing narrow band signals, thereby realizing the recording and reproduction of narrow band signals and wide band signals at identical rotating speed of the cylinder and at identical rotating speed of the capstan. Or, the rotating speed of the cylinder is increased when recording and reproducing wide band signals and the head width used for recording and reproducing wide band signals is set narrower than the head width used when recording and reproducing the existing wide band signals, thereby realizing the recording and reproduction of narrow band signals and wide band signals at identical rotating speed of the capstan.

8 Claims, 6 Drawing Sheets

| SIGNAL TYPE | NUMBER OF HEADS | CYLINDER ROTATION SPEED |
|---|---|---|
| NARROW BAND SIGNAL | 2 | 1800 RPM |
| BAND-COMPRESSED HD SIGNAL | 2 | 3600 RPM |
| BAND-COMPRESSED HD SIGNAL | 4 | 1800 RPM |
| HD SIGNAL | 4 | 3600 RPM |

VIDEO TAPE RECORDER CAPABLE OF RECORDING BOTH NARROWBAND AND WIDEBAND SIGNALS

BACKGROUND OF THE INVENTION

1. Field of the Invention

This invention relates to a video tape recorder (VTR) capable of recording and reproducing any of plural signals largely different in frequency bands including narrow band signals such as NTSC signals and wide band signals such as high definition television signals for presenting more definite images than NTSC.

2. Description of the Prior Art

A method for recording and reproducing the conventional signals having a frequency band of about 4 to 5 MHz such as NTSC signal and PAL signal and signals for presenting more definite images, for example, high definition signals (HD signals) and signals called HDMAC proposed in Europe, having a wide frequency band of about 8 to 20 MHz which is two to five times that of the NTSC signal, all by one VTR was disclosed in the U.S. Pat. No. 4,730,222. This method was designed to detect whether the input signals were the narrow band signals like the conventional NTSC signals or the wide band signals like the HD signals, and increase the rotating speed of the cylinder, for example, two times for wide band signals and double the running speed of the tape, thereby to enlarge the capacity of the electromagnetic converting system twice as much as that of narrow band signals, thereby enabling to record and reproduce the wide band signals. In other words, this method was to increase the rotating speed of the cylinder and running speed of the tape in proportion to the input signal band.

The method, however, had two problems. One thing was that, when the band of the wide band signal became two to five times as wide as the conventional signal, it was necessary to accelerate the rotating speed of cylinder, running speed of tape and the FM carrier frequency individually 2 to 5 times, so that it was difficult to obtain satisfactory performances in the electromagnetic converting system such as abrasion property of the head, head efficiently and noise caused by head rubbing. The other problem was that the recording time was reduced in reverse proportion to the running speed of the tape, which was a serious problem in a VTR.

SUMMARY OF THE INVENTION

It is hence a primary object of this invention to present a VTR capable of recording and reproducing narrow band signals such as the conventional NTSC signals, and capable of recording and reproducing wide band signals without accelerating the rotating speed of the cylinder when wider band signals than the conventional signals are entered.

It is another object of this invention to present a VTR capable of recording and reproducing narrow band signals such as the conventional NTSC signals, and when wider band signals than the conventional signals are entered, capable of recording and reproducing the wide band signals by increasing the rotating speed of cylinder and at the same time not reducing the recording and reproducing time.

To achieve the above objects, a VTR of the present invention detects whether an input signal is a narrow band signal or a wide band signal by signal-judging means, subjects the input signal to time-axis conversion for expanding the axis of time by a time axis-expanding circuit in signal processing means when a wide band signal is entered, and at the same time divides the wide band signal into plural channels. When designed in this way, if the time axis is expanded, for example, by two times and the signal is simultaneously divided into two channels, it becomes possible to decrease the band per channel into a half without sacrificing information of the input signal. That is, even when the input signal is a wide band signal, the band per channel can be changed into a narrow band, and as a result, the wide band signal can be recorded and reproduced at the same relative speed of the conventional tape and head. The number of heads used in this case is increased from that used in conventional recording and reproducing of narrow band signals, for example, twice as many heads.

Another VTR of this invention has two kinds of recording and reproducing heads for the conventional narrow band signals and for wide band signals on the rotating cylinder, and sets the head width of the head for recording and reproducing wide band signals narrower than that of the head for recording and reproducing narrow band signals. When the signal judging means judges that a wide band signal is entered, the head for recording and reproducing wide band signals with a narrower width is selected and the rotating speed of the cylinder is increased. By this method, the relative speeds of the tape and the head are increased, which makes it possible to record and reproduce wide band signals by keeping the consumption rate of the tape at almost the same as in the conventional rate.

When designed in the above way it becomes possible to record and reproduce plural types of signals by one VTR including narrow band signals such as NTSC signals, HD signals for producing more definite images and band-compressed HD signals which are produced by compressing the band of HD signals so that the frequency band be reduced to 8 to 10 MHz by digital processings. Such a system can, moreover, possess compatibility with the existing VTR for commercial use, for example, VHS format VTR.

DESCRIPTION OF THE PREFERRED EMBODIMENTS

Figure 1:
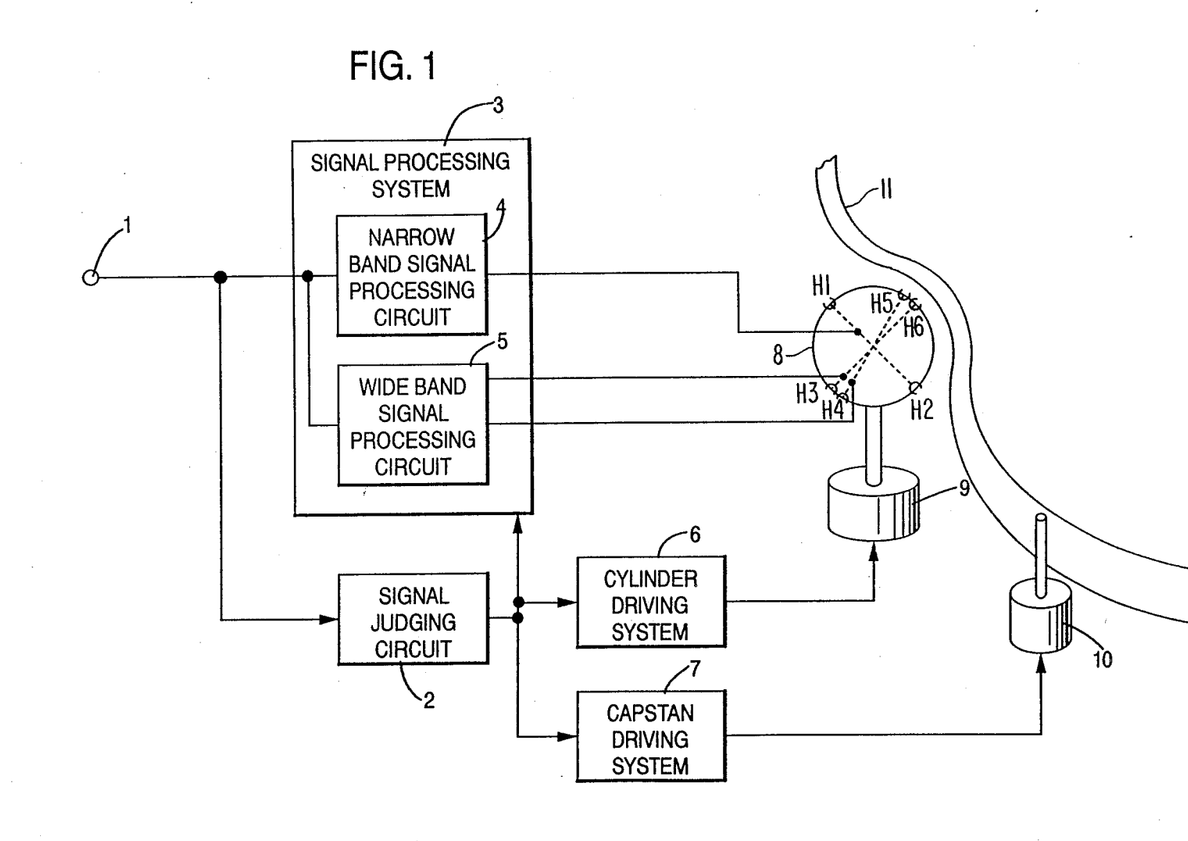
FIG. 1 is a block diagram of a first embodiment of the present invention.
Figure 2:
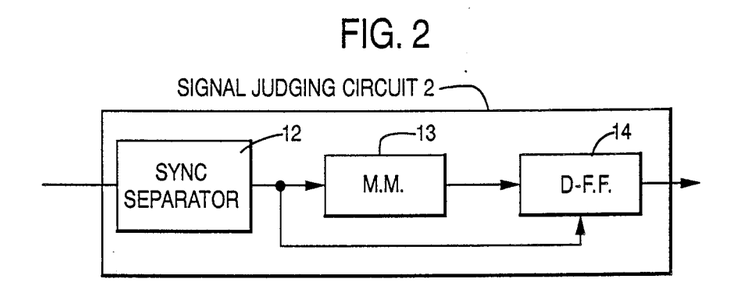
FIGS. 2 and 3 are explanatory drawings of a signal judging circuit of this invention.
Figure 3A:
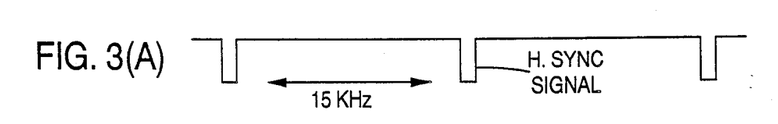
Figures 3B, 3C:
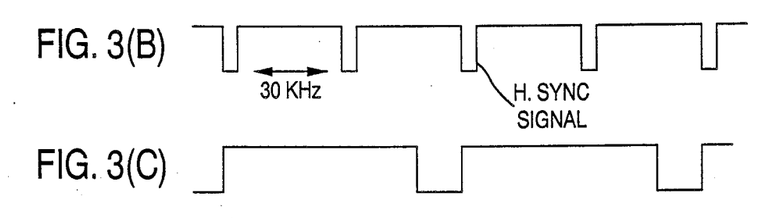

FIG. 1 shows a block diagram of a first embodiment of this invention. A signal judging circuit 2 judges whether a signal entered through a terminal 1 is the existing signal (for example, NTSC signal) or a wide band signal for presenting more definite images (for example, HD signal or band-compressed HD signal). For judging, a method of judging the period of synchronizing signals is sufficient, and its block diagram is shown in FIG. 2 and its waveform diagram is shown in FIG. 3. This system is composed of a synchronizing separator 12 for detecting the horizontal synchronizing signal, a monomultivibrator 13 and a flip-flop circuit 14, and it is designed to detect by making use of the fact that the horizontal period of narrow band signal is, as shown in FIG. 3A, about 15 kHz while the horizontal period of wide band signal is about 30 kHz as shown in FIG. 3B. The output of the monomultivibrator 13 of retrigger type is at high level in the wide band signal, and to the contrary, it plots a waveform shown in FIG. 3C in the narrow band signal, and as a result, the output from the flip-flop circuit 14 is at high level in the case of the wide band signal and at a low level in the case of the narrow band signal.

Figure 4:
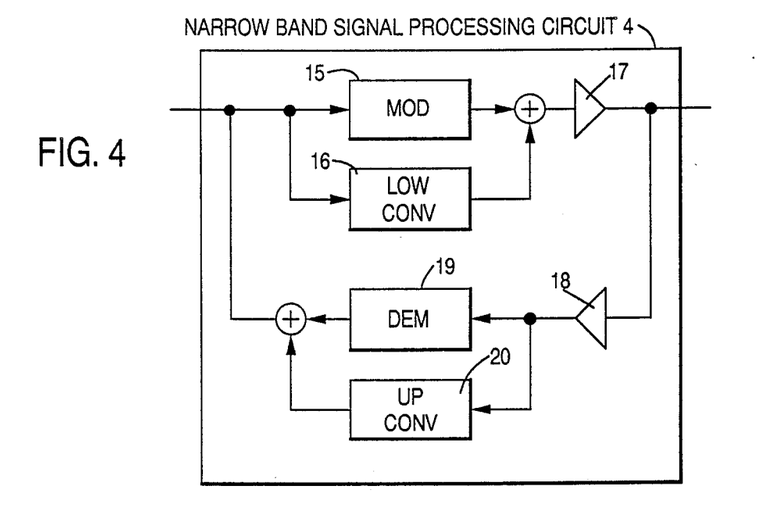
FIG. 4 is a block diagram of a processing circuit of narrow band signals in the present invention.

A signal processing system 3 processes signals by a method specified for each type of input signal depending on information from the signal-judging circuit 2. That is, the present narrow band signal is processed in a narrow band signal processing circuit 4 in a color-under system (for example, in VHS format) as shown in FIG. 4, where, for recording, chrominance components are converted into low frequency by a low frequency converting circuit 16, and luminance signals are modulated of their frequency by a frequency modulator 15, and then after mixing with low frequency converted chrominance components, these signals are recorded on a tape by heads H1 and H2 through a recording amplifier 17, and for reproducing, reproduced signals from the heads H1 and H2 are passed through a reproduction amplifier 18, and then converted to reproduced demodulation signals by a frequency demodulator 19 and a high frequency converting circuit 20. This processing system is well known. In this drawing, the connection line is expressed by a single line for the convenience sake, but a recording amplifier and a reproduction amplifier are actually connected to the heads respectively, and a selector between recording and reproduction and a switching circuit of a pair of heads at reproduction are omitted because they are well known. It is the same in the following embodiments.

Figure 5:
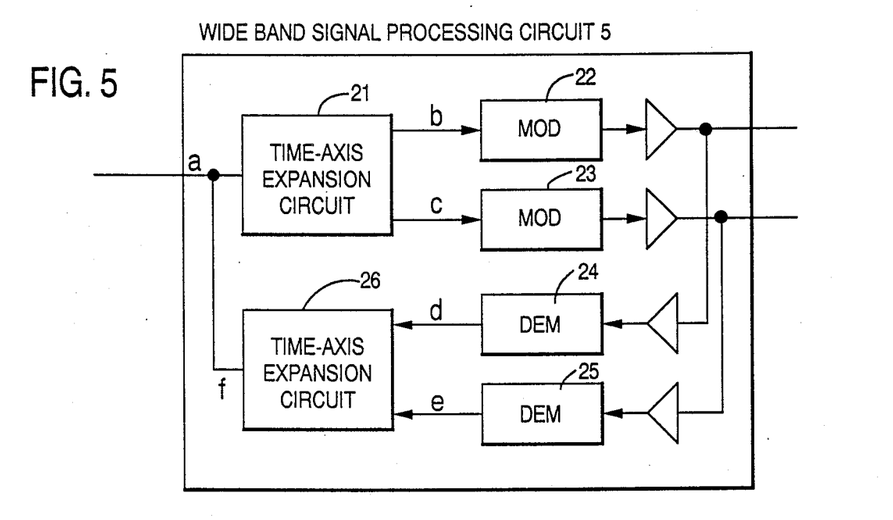
FIG. 5 is a block diagram of a processing circuit of wide band signals in this invention.
Figure 6A:
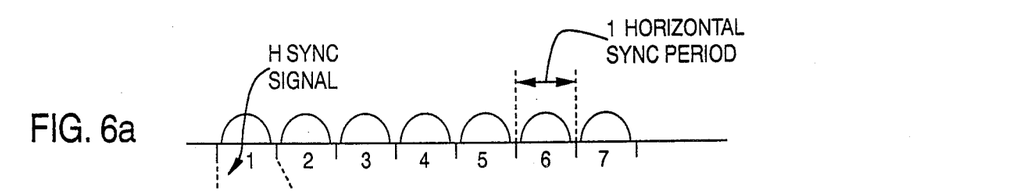
FIG. 6 is an explanatory drawing of a signal processing circuit.
Figure 6B:
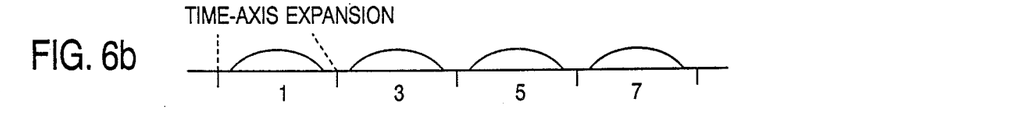
Figure 6C:
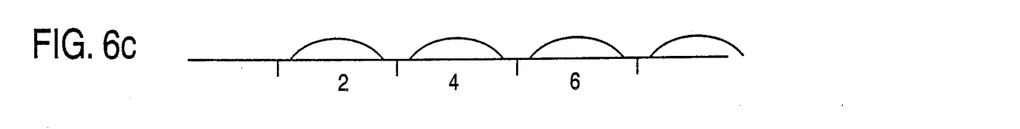
Figure 6D:
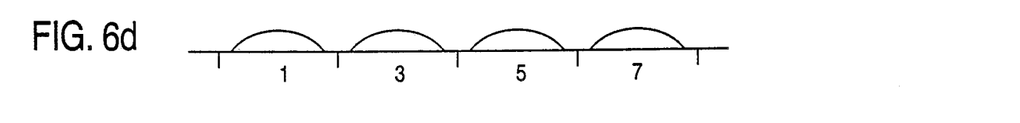
Figure 6E:
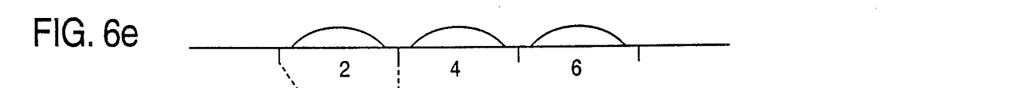
Figure 6F:
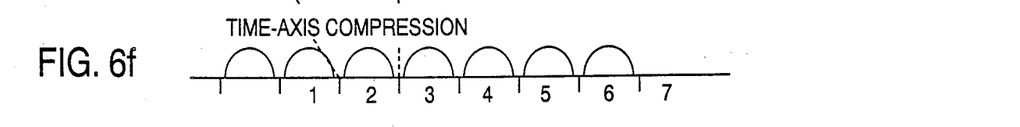

When the input signal is a wide band signal such as an HD signal, it is processed in a wide band processing circuit 5. Its block diagram is shown in FIG. 5. When recording, the time axis is expanded by a time axis expanding circuit 21. For example, by expanding two times and dividing into two channels, the frequency band on each channel is reduced to a half, and the signals are converted so that their frequencies used at a head becomes within a range of specified band. The waveforms at this moment are shown in FIG. 6 at a, b and c, where signals b and c are in a half frequency band of that of signal a. The signals b and c which are regulated of their bands into a half are subjected to frequency modulation at two frequency modulators 22 and 23, and they are recorded on a tape by heads H3, H4, H5 and H6 through recording amplifiers. When reproducing, the reproduction signals reproduced from reproduction heads H3, H4, H5 and H6 are passed through reproduction amplifiers, and frequency-demodulated by frequency demodulators 24 and 25, and their time axes are compressed by a time axis compression circuit 26. The waveforms at this moment are shown in FIG. 6 at d, e and f. In this time axis compression circuit, the channels are combined into one and the frequency band of signal f is multiplied by two times, thereby regenerating the wide band signal.

In addition, by making the width of the heads H3, H4, H5 and H6 narrower than the conventional heads H1 and H2, for example, into a half, it is possible not to reduce the recording and reproducing periods of wide band signals.

Figure 7:
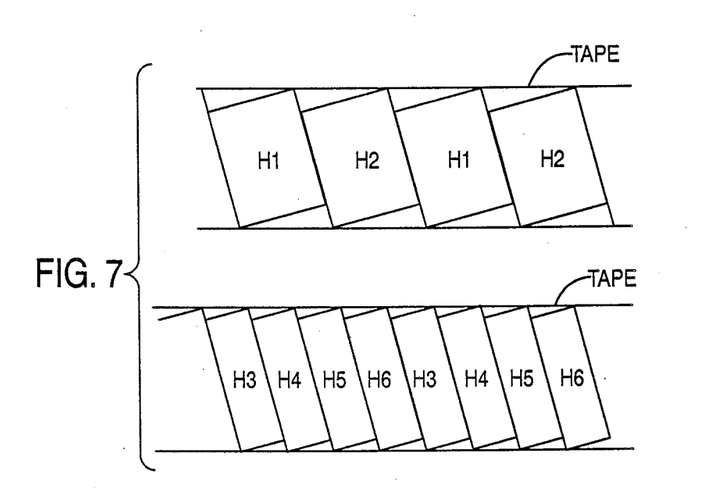
FIG. 7 is a drawing showing a recording track of this invention.

The recording track on the tape at this moment is shown in FIG. 7. The area recorded by the heads H1 and H2 is equal to the area recorded by the heads H3, H4, H5 and H6, which means that identical period of recording and reproduction is possible.

In FIG. 1, a rotary cylinder 8 is driven by a cylinder driving system 6, and a capstan 10 is driven by a capstan driving system 7. The cylinder driving system 6 and the capstan driving system 7 are controlled to specified actions by the signal judging circuit 2.

In the above first embodiment, when designed to use four heads with a half width of the conventional heads when recording and reproducing wide band signals, the rotating speeds in both the cylinder driving system and the capstan driving system can be identical to those when the narrow band signals are entered, and therefore the actions of these systems may be completely identical. If the head width is more than a half, however, though the cylinder driving system may be identical, the capstan driving system should be driven at a higher speed than the present speed.

When reproducing, the signal judging circuit 2 judges the type of recorded signals depending on information of the reproduced signals delivered from the signal processing circuit 3.

Figure 8:
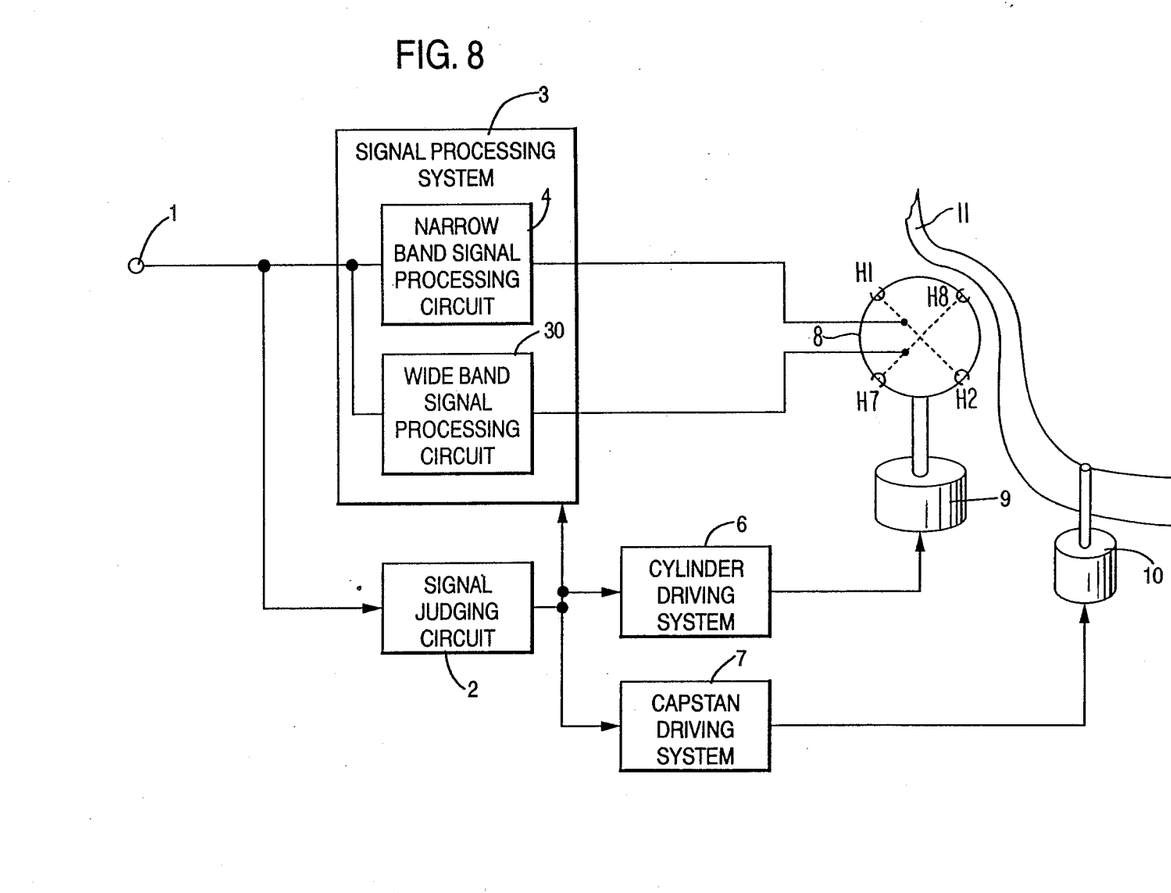
FIG. 8 is a block diagram of the second embodiment of this invention.

FIG. 8 shows a block diagram of a second embodiment of the present invention. In this embodiment, different points from the first embodiment are a wide band signal processing circuit 30 and the number of heads used, and the others are the same.

Figure 9:
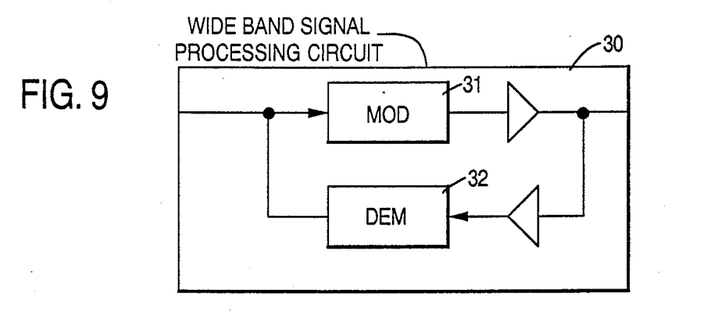
FIG. 9 is a block diagram of a processing circuit of wide band signals in the second embodiment of the present invention.
Figure 10A:
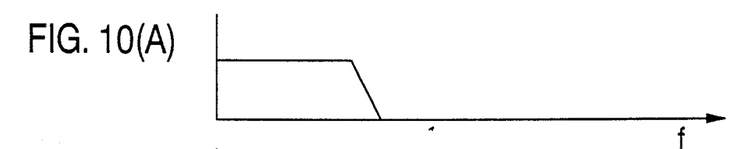
FIG. 10 is a spectrum drawing for explaining the processing circuit of wide band signals in the second embodiment.
Figure 10B:
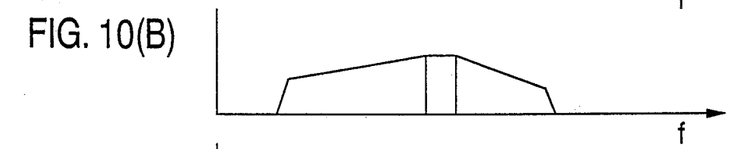
Figure 10C:
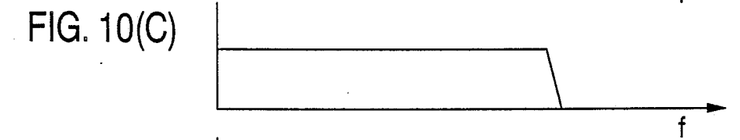
Figure 10D:
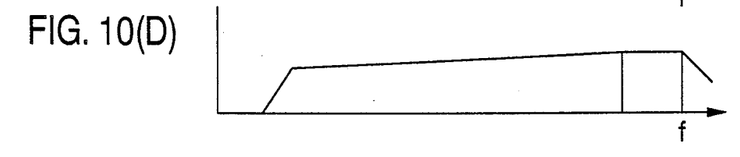

The signal processing system 3 processes the signals in the method specified for each type of input signal depending on information from the signal judging circuit 2. That is, the present narrow band signal such as the NTSC signal are processed in a color-under system by the narrow band signal processing circuit 4. The wide band signal is processed by the wide band signal processing circuit 30. A block diagram of the wide band signal processing circuit 30 is shown in FIG. 9. The wide band signal processing circuit 30 is composed of a modulating circuit 31 and a demodulating circuit 32, and it acts to modulate the frequency at a higher frequency than the input signal band. An example of the FM spectrum at this moment is shown in FIG. 10. FIG. 10 A expresses the present narrow band signal, B is its frequency-modulated spectrum diagram, C indicates the wide band signal, and D is its frequency-modulated spectrum diagram. That is, the frequency is modulated at a higher frequency than the highest frequency of the input signal. In this way, the modulated signal is recorded on the magnetic tape by heads H7 and H8 on the rotary cylinder, or reproduced in the same way.

The rotary cylinder 8 and the capstan 9 are controlled by the cylinder driving system 6 and the capstan driving system 7 respectively, and the cylinder driving system and the capstan driving system are controlled depending on information from the signal judging circuit 2. Here, the rotating speed of the cylinder is controlled according to the frequency of the entered wide band signal. When the wide band signal has, for example, a band from 8 to 10 MHz, the rotating speed of the cylinder is controlled to a double speed. At this moment, since the widths of the heads H7 and H8 are set to a half of the width of the heads H1 and H2, there is no possibility that the recording tracks overlap each other even when the rotating speed of the cylinder is increased twice, and it is, therefore, unnecessary to increase the running speed of the tape. It means the recording period is not reduced.

When the entered wide band signal has a band width three times that of the narrow band signal, moreover, by controlling the rotating speed of the cylinder to increase three times, and at the same time, setting the widths of the heads H7 and H8 into one third, the recording period is not reduced in the same mechanism.

In other words, though the cylinder driving system increases the rotating speed of the cylinder depending on the frequency band of the input signal, the capstan driving signal may be identical, and hence the recording period is not reduced.

When reproducing, the signal judging circuit 2 judges the type of recorded signals depending on information of the reproduced signals delivered from the signal processing circuit 3.

Figure 11:
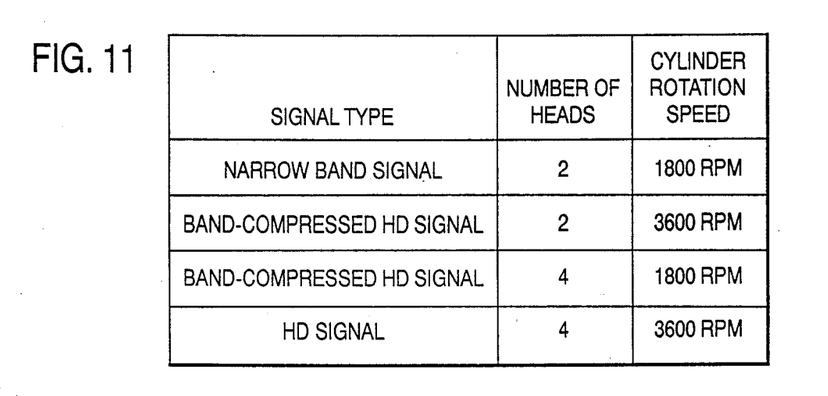
FIG. 11 is a drawing showing the relation between the signal type and number of heads and rotating speed of the cylinder.

FIG. 11 shows an example of the number of heads used and the rotating speed of the cylinder corresponding to the input signal type respectively.

When recording and reproducing the NTSC signal which is a narrow band signal of 4 to 6 MHz in band by using, for example, a VHS format, two heads H1 and H2 in FIG. 1 are used, that is, the narrow band signal processing circuit 4 where two heads H1 and H2 are connected is actuated, and the rotating speed of the cylinder is set at 1800 rpm.

In the case of the band-compressed HD signal of 8 to 10 MHz in band, the wide band signal processing circuit 5 in which four heads H3, H4, H5 and H6 are connected as shown in FIG. 1 is operated, and the rotating speed of the cylinder remains at 1800 rpm. Or the wide band signal processing circuit 30 in which two heads H7 and H8 are connected as shown in FIG. 7 is actuated and the rotating speed of the cylinder is doubled to 3600 rpm. It means the recording density per unit time is doubled.

For the HD signal of about 20 MHz in band, four heads H3, H4, H5 and H6 are used as shown in FIG. 7, and the rotating speed of the cylinder is set at 3600 rpm. It can be realized by using both methods shown in the first embodiment and the second embodiment at the same time. At this moment, the recording density per unit time is increased four times.

As described above, the recording density per unit time is changed by selecting the relative speeds of the tape and head and the number of channels, thereby making it possible to efficiently record and reproduce signals in any types, and also capable of having compatibility with the existing system (for example, VHS format).

By using heads for recording and reproducing wide band signals having widths narrower than those in the head for recording and reproducing the NTSC signal, it is possible not to reduce the recording and reproducing time. The heads used by a long-playing mode in VHS format are, meanwhile, designed with narrower width in comparison with the heads H1 and H2 used in recording and reproduction by a standard-playing mode in VHS format shown in FIG. 1. By making use of this design, it is also possible to use the heads for the long-playing mode commonly as those for recording and reproducing the wide head signals.

Here in the above embodiment, the number of heads used when recording and reproducing wide band signals is set to be two and four as examples, but it is not limited, and the rotating speed of the cylinder is likewide not limited to 1800 rpm and 3600 rpm.

The important thing here is that the product of the number of heads used and the rotating speed of cylinder is almost in proportion to the frequency band of the input wide band signals, and as a result, the number of heads used and the rotating speed of cylinder are not limited.

The signals judging circuit 2 may be replaced by a switch operated by an operator.

As the fist input signal, the NTSC signal which is a narrow band signal is taken up as an example, but other signals such as PAL signal and SECAM signal are also acceptable as far as the frequency band is as narrow as 4 to 6 MHz.

The band-compressed HD signal means the signal of 8 to 12 MHz in band including MUSE signal (Multiple Sub-Nyqust Sampling Encording) which is proposed in Japan, and HDMAC signal which is proposed in Europe.

When a VTR is designed so as to be able to record and reproduce all three different types of signals that is, narrow band signals, band-compressed HD signals and wide band HD signals, and select properly the number of heads and the rotating speed of cylinder suitable for the frequency band, such VTR is also included in the scope of the invention. In such a case, three types of signal processing circuits are required.

What is claimed is:
1. A video tape recorder comprising:
a cylinder on which a plurality of heads are mounted;
a capstan for transporting a tape;
a signal detecting means for detecting whether an input signal is a first signal or a second signal, said second signal having a wider frequency band than that of said first signal;
a signal processing means responsive to an output of said signal detecting means for recording said first signal on said tape by n heads selected from among said plurality of heads after processing the said input signal by a first processing method when the input signal is said first signal, and for recording said second signal on said tape by m heads selected from among said plurality of heads after processing the input signal by a second processing method containing a means for expansion and compression of the time axis of said second signal when the input signal is said second signal, where n is an integer equal to the number of heads used for recording said first signal and m is an integer equal to the number of heads used for recording said second signal and m is larger than n;
a capstan driving means responsive to said output of said signal detecting means for driving said capstan so as to transport said tape at a first running speed when the input signal is said first signal and so as to transport said tape at a second running speed which is equal to or faster than said first running speed when the input signal is said second signal; and a cylinder driving means for driving said cylinder so as to rotate at an almost constant speed.

2. A video tape recorder as set forth in claim 1, wherein said first signal is an NTSC signal, a PAL signal or a SECAM signal, and said second signal is a high definition television signal having a frequency band almost two to five times that of said first signal, or a signal which is formed by compressing the frequency band of said high definition television signal.

3. A video tape recorder as set forth in claim 1, wherein said signal processing means includes a means for executing color-under recording wherein said first signal is recorded by converting chrominance components into low frequency components, and mixing with frequency-modulated luminance signal components.

4. A video tape recorder as set forth in claim 1, wherein n is equal to 2 and m is in a range of between 4 and 6.

5. A video tape recorder comprising:
a cylinder on which a first head having a width HA and a second head having a width HB are mounted;
a capstan for transporting a tape;
a signal detecting means for detecting whether an input signal is a first signal or a second signal, said second signal having a wider frequency band than that of said first signal;
a signal processing means responsive to an output of said signal detecting means for recording on and reproducing from said tape said first signal by said first head after processing the input signal in a first method when the input signal is said first signal, and for recording on and reproducing from said tape said second signal by said second head after processing the input signal in a second method when the input signal is said second signal;
a cylinder rotating means responsive to said output of said signal detecting means for rotating said cylinder at a first rotating speed when the input signal is said first signal, and for rotating said cylinder at a second rotating speed which is faster than said first rotating speed when the input signal is said second signal; and
a capstan driving means for driving said capstan so as to keep a running speed of said tape constant;
wherein a ratio of said head width HA to said head width HB is set approximately in reverse proportion to a ratio of said first rotating speed of said cylinder to said second rotating speed of said cylinder, thereby keeping a recording time or a reproducing time constant.

6. A video tape recorder as set forth in claim 5, wherein said first signal is an NTSC signal, a PAL signal or a SECAM signal, and said second signal is a high definition television signal having a frequency band almost two to five times that of said first signal, or a signal which is formed by compressing the frequency band of said high definition television signal.

7. A video tape recorder as set forth in claim 5, wherein said signal processing means includes a means for executing color-under recording wherein said first signal is recorded by converting chrominance components into low frequency components and mixing with frequency-modulated luminance signal components.

8. A video tape recorder as set forth in claim 5, wherein said second rotating speed of said cylinder is two or three times as fast as said first rotating speed of said cylinder.

* * * * *